UNITED STATES PATENT OFFICE.

HENRY EBERDING, OF PATERSON, NEW JERSEY.

WELDING COMPOUND.

SPECIFICATION forming part of Letters Patent No. 584,581, dated June 15, 1897.

Application filed March 29, 1897. Serial No. 629,755. (No specimens.)

*To all whom it may concern:*

Be it known that I, HENRY EBERDING, a citizen of the United States, residing in Paterson, county of Passaic, and State of New Jersey, have invented certain new and useful Improvements in Welding Compounds; and I do hereby declare the following to be a full, clear, and exact description of the invention, such as will enable others skilled in the art to which it appertains to make and use the same.

The object of my present invention is to provide a compound for welding metals, such as steel, iron, &c., which when used will amalgamate with the metals and thus form a strong and indestructible joint.

The compound consists of filings or turnings of steel or iron or of ground iron or steel, one part; borax, one part, and ashes, such as wood-ashes, one part.

In preparing this compound the ashes are mixed with water to a pasty mass, when borax is added to it and thoroughly mixed with the same. The surplus of water is then allowed to evaporate by heating or boiling said mixture, which is then calcined, and after same is ground the steel or iron filings or turnings or the ground iron or steel is added and thoroughly mixed. By adding water to the ashes a certain amount of carbonate of potash and of the chlorid, sulfate, and silicate of potash are dissolved and can be poured away before said mass is subjected to heat for the purpose of allowing the water to evaporate. This is very important, as a surplus or too much of potash is objectionable and injurious to the metals to be welded together. On the other hand, the earthy phosphates and carbonates contained in wood-ashes and which are not dissolved by water contribute to the welding capacity of the compound.

In using the above-named composition the portions to be welded or soldered together after having been cleaned are covered with the compound and are then subjected to heat until they become red-hot.

It must be remarked that a compound of the above description can be very cheaply manufactured, especially as ashes at the present time are of hardly any commercial value. Furthermore, in using the above compound less heat is consumed than in other compounds and yet the joints are strong and indestructible.

Having thus described my invention, what I claim as new, and desire to secure by Letters Patent, is—

1. The within-described compound consisting of ground steel or iron or filings or turnings thereof, borax, and ashes, such as wood-ashes, compounded substantially as specified.

2. The within-described compound consisting of ground steel or iron or filings or turnings thereof, one part, borax one part, and ashes, such as wood-ashes, one part, compounded substantially as described.

In testimony that I claim the foregoing I have hereunto set my hand this 26th day of March, 1897.

HENRY EBERDING.

Witnesses:
ALFRED GARTNER,
L. SNYDER.